United States Patent [19]
Yiu

[11] Patent Number: 6,008,777
[45] Date of Patent: Dec. 28, 1999

[54] WIRELESS CONNECTIVITY BETWEEN A PERSONAL COMPUTER AND A TELEVISION

[75] Inventor: Timothy C. Yiu, Saratoga, Calif.

[73] Assignee: Intel Corporation, Santa Clara, Calif.

[21] Appl. No.: 08/813,643

[22] Filed: Mar. 7, 1997

[51] Int. Cl.[6] .................................................... G09G 5/00
[52] U.S. Cl. ........................ 345/2; 345/156; 341/173; 348/552; 348/734; 348/8; 455/6.3
[58] Field of Search ............................. 345/156 R, 157, 345/2; 341/173–175; 395/200.34, 200.35, 821; 348/734, 10, 552, 723, 8; 455/6.2, 6.3

[56] References Cited

U.S. PATENT DOCUMENTS

| | | | |
|---|---|---|---|
| 4,425,581 | 1/1984 | Schweppe et al. | 358/148 |
| 4,581,646 | 4/1986 | Kubodera | 358/181 |
| 4,924,216 | 5/1990 | Leung | 345/161 |
| 5,202,669 | 4/1993 | Ishimochi et al. | 340/721 |
| 5,204,768 | 4/1993 | Tsakiris et al. | 359/148 |
| 5,283,819 | 2/1994 | Glick et al. | 348/552 |
| 5,394,259 | 2/1995 | Takahara | 359/142 |
| 5,568,205 | 10/1996 | Hurwitz | 348/723 |
| 5,574,964 | 11/1996 | Hamlin | 455/3.1 |
| 5,579,308 | 11/1996 | Humpleman | 370/58.1 |
| 5,594,660 | 1/1997 | Sung et al. | 364/514 R |
| 5,675,390 | 10/1997 | Schindler et al. | 348/552 |
| 5,721,951 | 2/1998 | DorEl | 395/830 |
| 5,722,041 | 2/1998 | Freadman | 455/6.3 |
| 5,737,595 | 4/1998 | Cohen et al. | 395/611 |

FOREIGN PATENT DOCUMENTS

| | | | |
|---|---|---|---|
| 279558 | 8/1988 | European Pat. Off. | G09B 5/14 |
| WO94/13102 | 6/1994 | WIPO . | |

*Primary Examiner*—Daniel J. Wu
*Attorney, Agent, or Firm*—Blakely, Sokoloff, Taylor & Zafman LLP

[57] ABSTRACT

A method and an apparatus for remotely interacting with a PC. In one embodiment, a local PC interface unit is coupled to a PC located at a local site. The local PC interface unit is coupled to receive a video output signal and an audio output signal from the PC. The local input devices, such as the keyboard and the mouse, as well as the peripherals such as the monitor and speakers of the PC are also coupled to the local PC interface unit. The local PC interface unit converts the video and audio signals generated by the PC into a format suitable for playback on an ordinary home TV. The local PC device then transmits the converted audio/video signal via an RF wireless link to a TV interface unit, which is coupled to a TV for playback at a remote site. The TV interface unit also generates a separate audio signal suitable for being listened to from an ordinary home stereo. Remote input devices, such as a keyboard, mouse, trackball, joystick, or a game controller are coupled to a remote input device interface unit which may be located in the same room as the TV and home stereo. The remote input device interface unit receives remote input signals from each one of the remote input devices and multiplexes the remote input signals into a single remote input data stream. The remote input data stream is transmitted back to the local PC interface unit through a wireless link to enable interaction with the PC from the remote location.

24 Claims, 5 Drawing Sheets

WIRELESS CONNECTIVITY BETWEEN A PERSONAL COMPUTER AND A TELEVISION

BACKGROUND OF THE INVENTION

1. Field of the Invention

The present invention relates generally to personal computers and, more specifically, the present invention relates to a method and an apparatus for interfacing with a personal computer.

2. Description of the Related Art

Personal computers (PCs) are continuously becoming more prolific in homes as high power multimedia PCs continue to become more affordable. Home PCs are used for a variety of purposes, which include home business and educational purposes. With these typical home PC uses in mind, PCs have naturally been located in the home office or den. In addition to being used for home business or educational purposes, home PCs have also often been used for entertainment purposes, such as for example the playing of video games or the browsing of the world wide web.

Electronic entertainment at home is commonly centered around a home entertainment center, which is typically located in the living room or family room of a home. Home entertainment centers usually include a television (TV) and a home stereo. Accordingly, it is observed that the natural environment for people to "work" at home is in the den, while the natural environment for people to "play" or "relax" at home is in the family room.

Since the PC is commonly located in the den or office of a home, and is usually not located in the family room or living room where home entertainment is more natural, there have been prior art attempts to bring electronic entertainment solutions to the family rooms or living rooms of homes where the home entertainment centers are located. Some prior art solutions include low-cost set-top PCs, which typically include low end central processing units packaged in a consumer shell. These prior art solutions include video game consoles that generally use a TV to display video game graphics while playing a game. A problem with these types of prior art solutions is that the set-top PCs are generally low-cost items and are therefore limited in their use. For instance, the video game consoles are generally limited to playing video games and are typically incompatible with most home PCs that are usually located in the home office or den.

Thus, what is desired is a method and an apparatus for extending the use of a home PC from the home office or den into other rooms of the home, such as for example the family room or living room. Such a method and apparatus would enable a home PC located in a den to be connected to a TV and/or stereo of a home entertainment center located in a family room or a living room. Such a method and apparatus would provide a low-cost solution and would therefore be affordable to consumers. In addition, such a method and apparatus would provide wireless conductivity between the PC and the TV so as to eliminate the need for intrusive cabling or wiring throughout the home. With such a method and apparatus, a PC located in the den of a home can be interacted with from virtually any room in the home and therefore increase the usefulness of the PC.

SUMMARY OF THE INVENTION

A method and an apparatus for remotely interacting with a PC is described. In one embodiment, a video output signal of a PC located at a local site is transmitted through a first wireless link to a TV located at a remote site for display. A remote input device located at the remote site is manipulated to control the PC. The display on the TV at the remote site is updated accordingly in response to the remote input signal. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus for remotely interacting with a PC is disclosed. In the following description, numerous specific details are set forth in order to provide a thorough understanding of the present invention. It will be apparent, however, to one having ordinary skill in the art that the specific detail need not be employed to practice the present invention. In other instances, well known materials or methods have not been described in detail in order to avoid obscuring the present invention.

Figure 1:
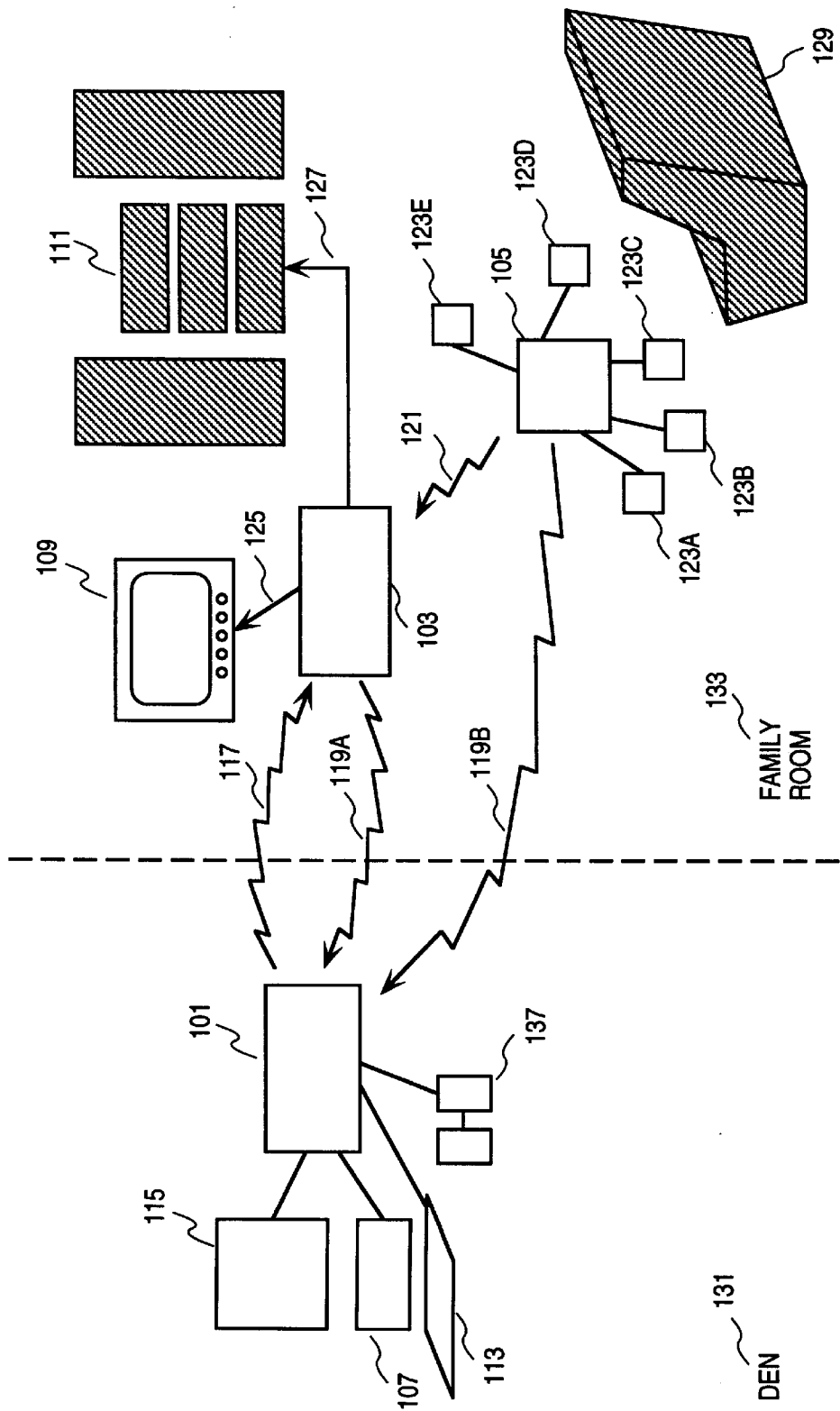
FIG. 1 is a block diagram of a PC interface system in accordance with the teachings of the present invention.

FIG. 1 is a block diagram illustrating a PC interface system in accordance with the teachings of the present invention. In one embodiment, a PC 107 is located in the den 131 of a typical home. Den 131 is shown on the left-hand side of dashed line 135 in FIG. 1. A monitor 115, a local input device such as a keyboard 113 and speakers 137 are coupled to PC 107 through a local PC interface unit 101. In one embodiment, a home entertainment center, including a TV 109 and a stereo system 111, is located in the family room 133, which is shown on the right-hand side of dashed line 135. As can be appreciated, the presently described invention is not limited to having a PC 107 located in den 131 and TV 109 located in family room 133. Den 131 and family room 133 were chosen merely to illustrate one possible configuration of the present invention. Moreover, it is appreciated that TV 109 may be any similar consumer video display device.

In one aspect of the present invention, interaction with PC 107 is wirelessly extended into the family room 133 from the den 131. As shown in FIG. 1, local PC interface unit 101 is coupled to receive an audio and video signal from PC 107 and then transmits an audio/video signal to the family room 133 through a wireless link 117, which is then displayed and heard through TV 109 and stereo 111 of a home entertainment center. The audio/video signal carried by wireless link 117 is received by a TV interface unit 103, which then outputs a corresponding audio/video signal 125 to TV 109 for playback on the display and speakers of TV 109. In one embodiment of the present invention, an audio signal 127 is also output to stereo 111 for audio reproduction. In one embodiment of the present invention, stereo 111 includes a high fidelity stereo system and speakers.

In one aspect of the present invention, a user sitting on couch 129 in family room 133 may interact with PC 107, which is located in the den 131, through remote input devices 123A–E. In one embodiment, remote input devices 123A–E may include common PC input devices, such as for example a keyboard 123A, mouse 123B, trackball 123C, joystick 123D, game controller 123E, or the like. Each remote input device 123A–E is coupled to a remote input device interface unit 105.

In one embodiment of the present invention, remote input device interface unit 105 transmits a remote input signal to local PC interface unit 101 through a wireless link 119B to control the PC 107. In another embodiment of the present invention, remote input device interface unit 105 transmits a remote input signal to the TV interface unit 103 through a wireless link 121. TV interface unit 103 receives the remote input signal through wireless link 121 and then forwards that remote input signal to the local PC interface unit 101 through another wireless link 119A.

In another embodiment, each remote input device 123A–E is directly coupled to the TV interface unit 103 through cables (not shown). In this embodiment, the cables coupling the remote input devices 123A–E to the TV interface unit 103 are of sufficient length to enable a user to manipulate the remote input devices 123A–E at a comfortable distance from TV 109 while sitting on couch 129. In this embodiment TV interface unit 103 transmits the remote input signal to local PC interface unit 101 through wireless link 119A without the need of remote input device interface unit 105 since the functionality of remote input device interface unit 105 is incorporated into TV interface unit 103.

After local PC interface unit 101 receives the remote input signal through either wireless link 119A or 119B, the remote signal may be used to control PC 107. In one aspect of the present invention, local PC interface unit 101 multiplexes the input signals received from local input device 113 with the input signals received from remote input devices 123A–E to control PC 107. Thus, it is noted that PC 107 may be controlled from local input device 113 and/or remote input devices 123A–E in accordance with the teachings of the present invention. Accordingly, PC 107 updates the audio/video output signals generated in response to the input signals received from local input device 113 and/or remote input devices 123A–E.

With the wireless links 117, 119A–B and 121 of the present invention, the remote input devices 123A–E may be positioned at a convenient location in family room 133 to allow a user to comfortably interact with PC 107. For example, remote input device interface unit 105 may be located on a coffee table positioned near couch 129 in family room 133 to allow a user to interact with PC 107, which is located in den 131, while sitting on the couch 129 and watching TV 109. Thus, a user has the option of being able to interact with PC 107 from a variety of locations in the home. For example, if on the one hand a user works at home and wishes to run word processing or other business-type software, the user may desire to operate PC 107 from den 131. If, on the other hand, the user desires to play a favorite video game while relaxing in the family room 133, the user may wish to remotely interact with PC 107 and play a computer video game or browse the world wide web while sitting on the couch 129 in the family room 133.

It is appreciated that with the presently described invention, a user only needs to buy one PC 107, but has the ability to remotely interact with PC 107 from a plurality of different rooms in the house. In another aspect of the present invention, a plurality of rooms in the home may be equipped with a TV 109, a TV interface unit 103 and a remote input device interface unit 105 to allow interaction with a single PC 107. In one embodiment, the audio/video signal carried in wireless link 117 may be broadcast to every room in the house (not shown) with a TV 109 in accordance with the teachings of the present invention.

Figure 2:
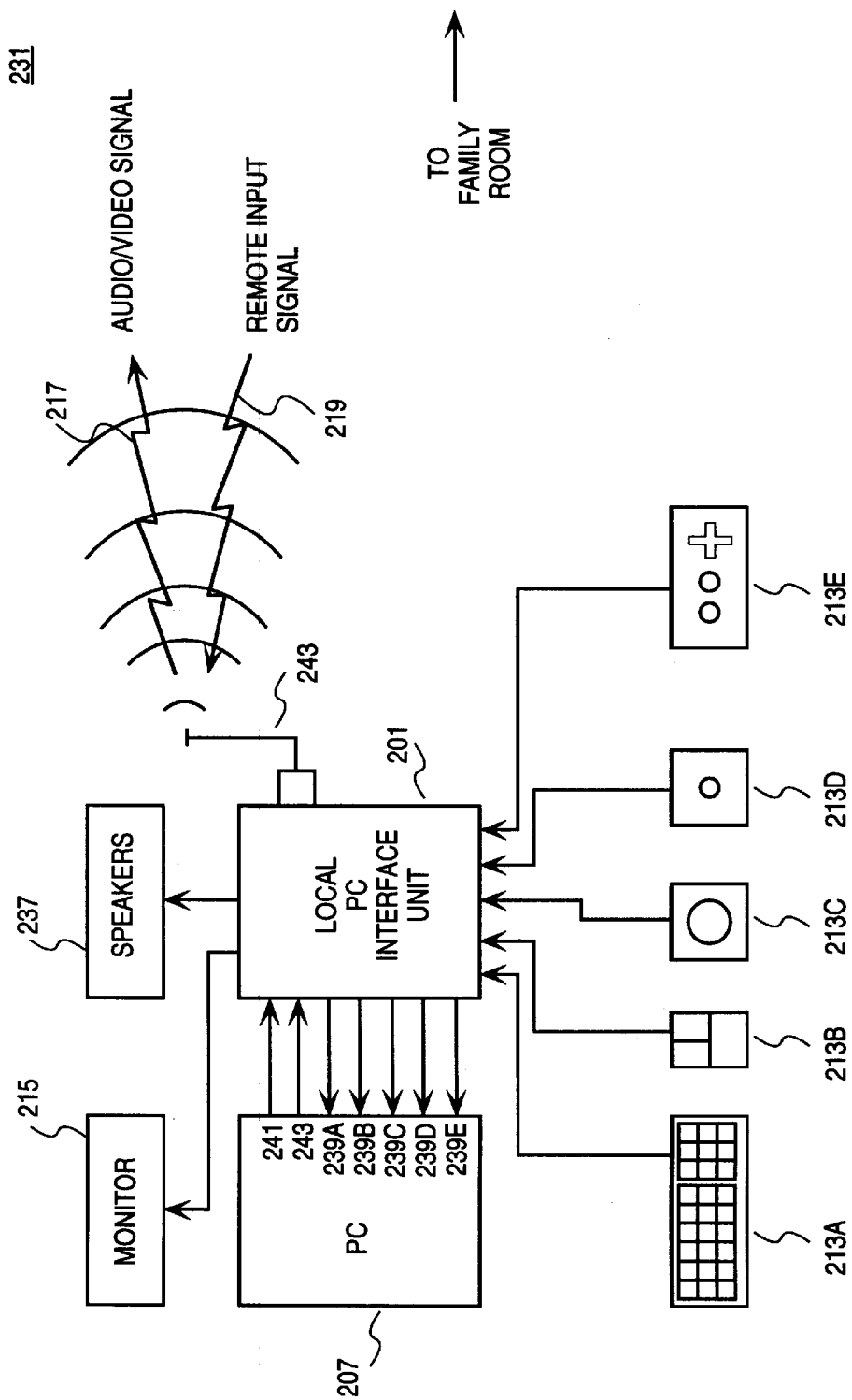
FIG. 2 is a block diagram of a local PC interface unit coupled to a PC located at a local site in accordance with the teachings of the present invention.

FIG. 2 is a block diagram of a local PC interface unit 201 coupled to a PC 207 located at a local site 231, such as for example a home office or den. PC 207 generates a video signal 241 and an audio signal 243, each of which are coupled to the local PC interface unit 201. Monitor 215 and speakers 237 are coupled to local PC interface unit 201 to enable the video signal 241 and audio signal 243 to be viewed and heard, respectively, while a user is interacting with PC 207 at the local site 231.

In one aspect of the present invention, video signal 241 is generated by PC 207 in a format suitable for display on a computer monitor, such as for example, but not limited to, a video graphics adapter (VGA) format, or a Super-VGA format, or the like. Local PC interface unit 201 includes converter circuitry, such as for example a scan converter (not shown) that converts the video signal 241 from a standard computer video format for display on a computer monitor 215 to any format suitable for display on an ordinary TV, such as for example a National Television Standards Committee (NTSC) format, a phase alternation by line (PAL) format, a high definition television (HDTV) format, or the like.

In another embodiment, local PC interface unit 201 may be configured to receive an audio/video signal from the PC 207 that has already been converted to a format suitable for display on an ordinary TV. This embodiment of the present invention is compatible with PCs that are equipped with circuitry (not shown) that converts standard computer video signals, such as for example VGA type signals, into audio/video signals in a format suitable for playback on an ordinary TV, such as NTSC type signals.

Local PC interface unit 201 includes circuitry to upshift the converted video and audio signals to a radio frequency (RF) signal for wireless transmission to a TV interface unit, which may be located in another room in the house. In another embodiment, the video and audio signals may be combined and transmitted from local PC interface unit 201 to the TV interface unit using well known spread spectrum techniques. Local PC interface unit 201 further includes transceiver circuitry 243 that transmits the RF signal to the TV interface unit through a wireless link 217. Transceiver 243 is also configured to receive a remote input signal through a second wireless link 219, which may originate from another room, such as for example the family room or living room. In one embodiment of the present invention, the remote input signal carried by wireless link 219 includes a data stream that may include multiplexed remote input signals, which include for example a remote keyboard signal, a remote mouse signal, a remote trackball signal, a remote joystick signal, a remote game controller signal, or the like.

As shown in FIG. 2, local PC interface unit 201 is also coupled to receive local input signals from a variety of local input devices which may include for example a keyboard 213A, a mouse 213B, a trackball 213C, a joystick 213D, a game controller 213E, or the like. Local PC interface unit 201 contains demultiplexing circuitry that demultiplexes the data stream carrying the remote input signal through wireless link 219 to separate the individual remote input signals received from the remote location. Local PC interface unit 201 further includes multiplexing circuitry to multiplex the remote input signals with the local input signals received from local input devices 213A–E to generate corresponding control signals to control PC 207. In one embodiment of the present invention, local PC interface unit 201 generates a keyboard control signal 239A, a mouse control signal 239B, a trackball control signal 239C, a joystick control signal 239D and a game controller signal 239E to control the PC 207. It is appreciated that control signals 239A–E may be serial-type connections, parallel-type connections, or the like.

Figure 3:
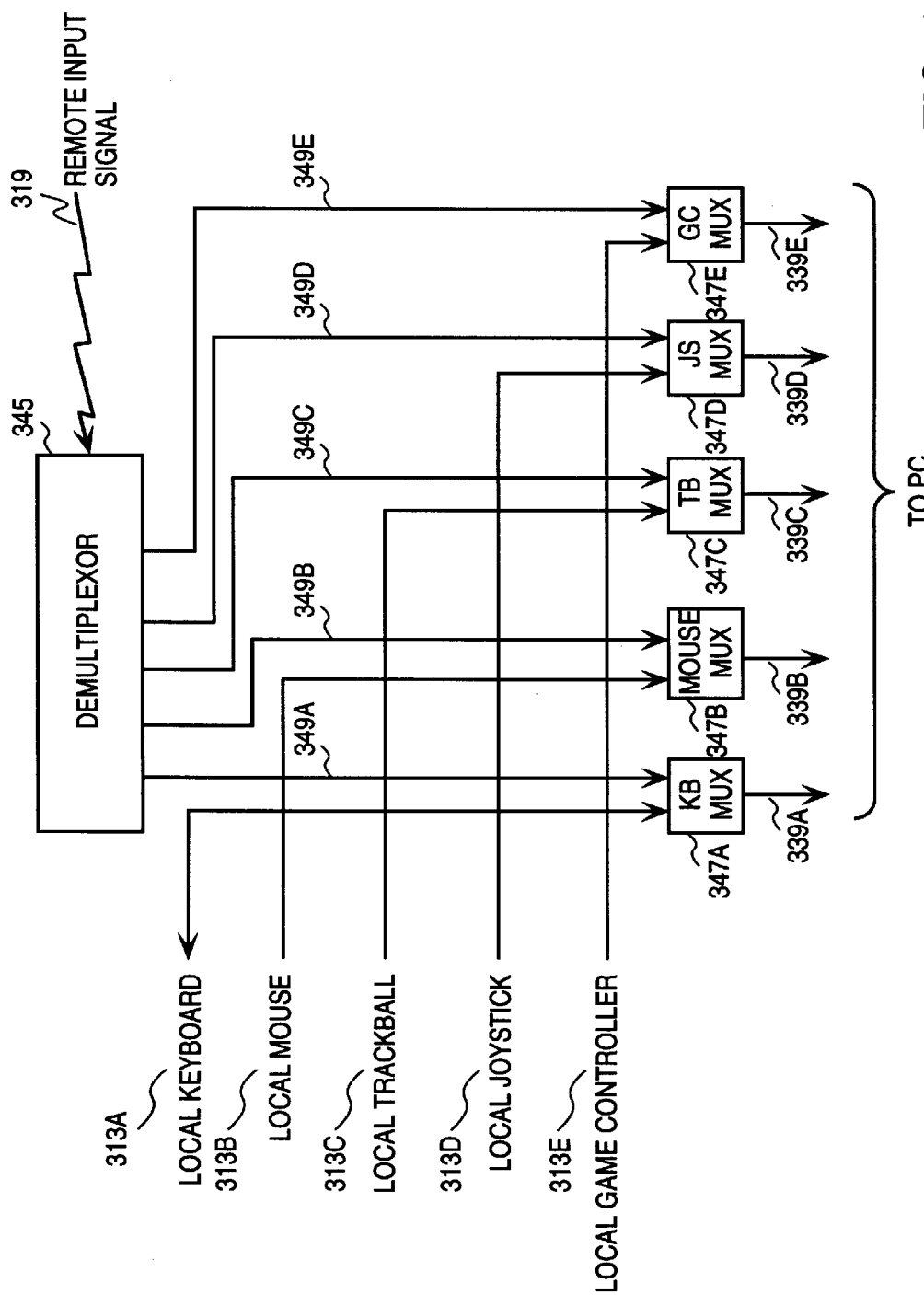
FIG. 3 is a block diagram of one aspect of the present invention that multiplexes and demultiplexes local and remote input signals within the local PC interface unit in accordance with the teachings of the present invention.

FIG. 3 is a block diagram of one embodiment of demultiplexing and multiplexing logic included within a local PC interface unit 301 in accordance with the teachings of the present invention. As shown in FIG. 3, a remote input signal, which includes a multiplexed data stream, is received through a wireless link 319 by demultiplexor 345. Demultiplexor 345 separates the multiplexed data stream into individual components which may include a remote keyboard input signal 349A, a remote mouse input signal 349B, a remote trackball input signal 349C, a remote joystick input signal 349D and a remote game controller signal 349E.

As shown in FIG. 3, local input signals are also received by local PC interface unit 301, which include a local keyboard input signal 313A, a local mouse input signal 313B, a local trackball input signal 313C, a local joystick input signal 313D and a local game controller signal 313E. A keyboard multiplexor 347A is coupled to receive local keyboard input signal 313A and remote keyboard input signal 349A and generates a keyboard control signal 339A. Mouse multiplexor 347B is coupled to receive local mouse input signal 313B and remote mouse input signal 349B and generates mouse control signal 339B. Trackball multiplexor 347C is coupled to receive local trackball input signal 313C and remote trackball input signal 349C and generates trackball control signal 339C. Joystick multiplexor 347D is coupled to receive local joystick input signal 313D and remote joystick input signal 349D and generates joystick control signal 339D. Game controller multiplexor 347E is coupled to receive local game controller input signal 313E and remote game controller input signal 349E and generates game control signal 339E.

In one embodiment, multiplexors 347A–E are bi-directional to provide bi-directional communications between the respective input device and the PC. For instance, keyboard multiplexor 347A may be bi-directional in one embodiment to provide bi-directional communications between the PC and a keyboard coupled to the keyboard multiplexor 347A.

Input control signals 339A–E are coupled to the PC to enable a user to interact with the PC from either a local site or a remote site. In one embodiment of the present invention, the logic of demultiplexor 345 and multiplexors 347A–E are configured to allow control of the PC from input signals from only one site at a time. Stated differently, demultiplexor 345 and multiplexors 347A–E may be configured to selectively allow either remote input signals 349A–E to be output as input control signals 339A–E or the multiplexors 347A–E may be configured to allow only the local input control signals 313A–E to be output as input control signals 339A–E. In this embodiment, the PC may be interacted with from only one location at a time.

In another embodiment of the present invention, inputs may be received from both the local input signals 313A–E and the remote input signals 349A–E as control signals 339A–E. In this embodiment, one user may be interacting with the PC using local joystick input control signal 313D while another user may be interacting with the PC from the family room using the remote game controller signal 349E. In another instance, one user may be interacting with the PC in the den using local keyboard input control signal 313A and another user may be remotely interacting with the PC using the remote keyboard input control signal 349A. In this embodiment, the PC may be interacted with from more than one location at a time.

Figure 4:
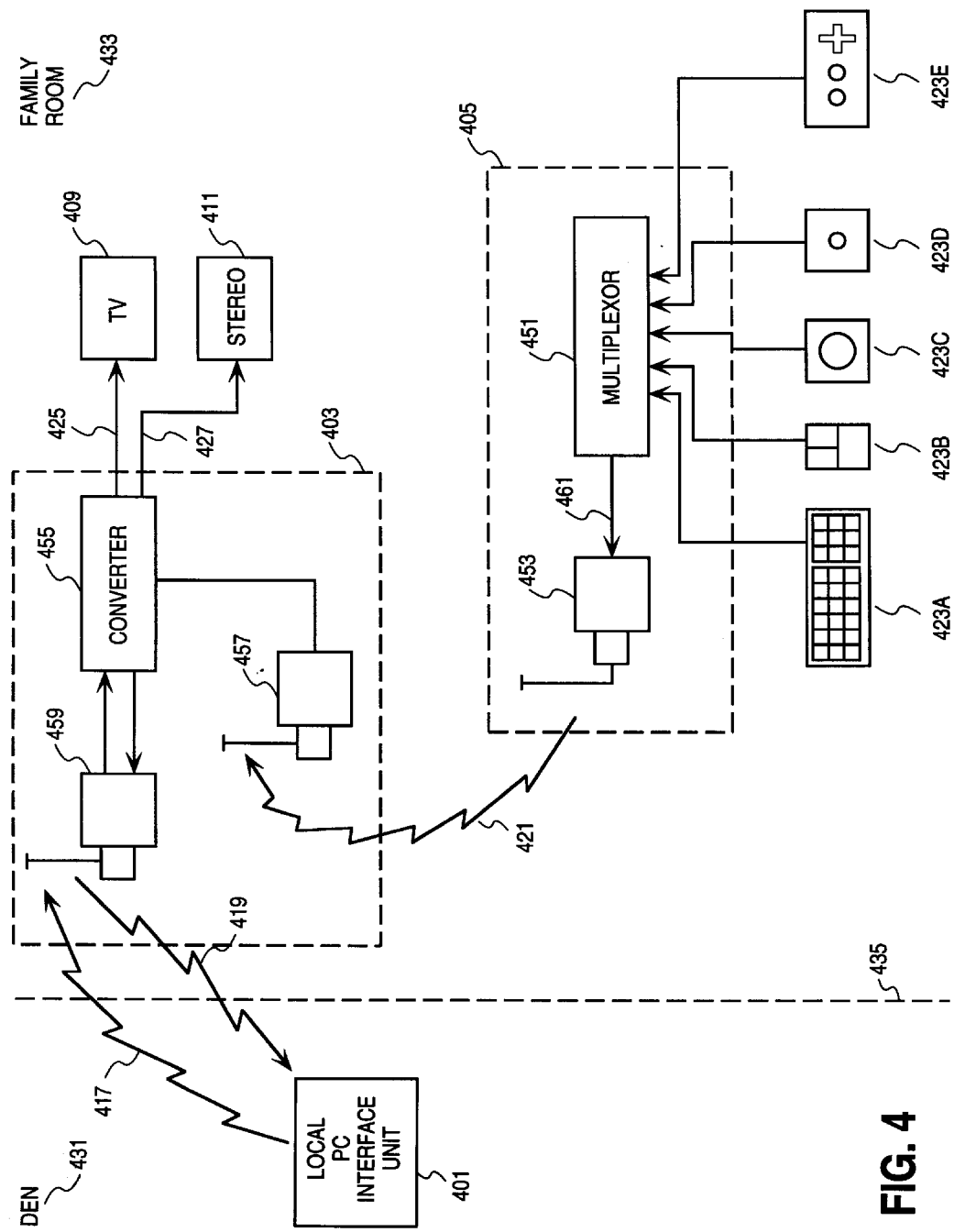
FIG. 4 is a block diagram illustrating the functional units of a TV interface unit and a remote input device interface unit of a PC interface system in accordance with the teachings of the present invention.

FIG. 4 is a block diagram illustrating one embodiment of a TV interface unit 403 and a remote input device interface unit 405 in accordance with the teachings of the present invention. As shown in FIG. 4, a local PC interface unit 401 is located in the den 431, which is on the left-hand side of dashed line 435. Local PC interface unit 401 generates an audio/video signal which is transmitted through a first wireless link 417 and is received by a transceiver 459 of the TV interface unit 403 located in the family room 433, which is on the right-hand side of dashed line 435. In one embodiment of the present invention, wireless link 417 carries an RF signal and converter 455 downshifts the RF signal to an audio/video signal suitable for display on a TV 409. In one embodiment of the present invention, converter 455 may include filter circuitry (not shown) to filter the received audio/video signals using well known techniques to enhance signal quality.

In one embodiment, the RF signal received by converter 455 from the local PC interface unit 401 is downshifted to a NTSC baseband video signal 425 which is received by TV 409. It is appreciated that other formats of the video signal output by TV interface unit 403 may be generated in accordance with the teachings of the present invention, so long as they are suitable for display on a TV 409. Other formats of video signals may include but are not limited to S-Video, PAL, HDTV, or the like.

In another embodiment of the present invention, converter 455 also generates a separate audio signal 427 suitable for playback on an audio reproduction device, such as for example a stereo 411. Thus, one embodiment of the present invention may be coupled to the TV 409 and/or a stereo 411 of a home entertainment center or home theater located in a family room 433.

In one embodiment of the present invention, remote input device interface unit 405 is configured to be coupled to ordinary PC input devices, such as for example a computer keyboard 423A, a mouse 423B, a trackball 423C, a joystick 423D or a game controller 423E. Remote input device interface unit 405 is coupled to receive the individual remote input signals from remote input devices 423A–E and multiplexes each of the remote input signals into a single data stream 461 with multiplexor 451. In one embodiment, the data stream that carries the mulitplexed remote input signals may be generated and processed using a Universal Serial Bus (USB). In that embodiment, all of the remote input devices may be coupled to the USB such that each of the respective input signals are combined into the data stream in accordance with the teachings of the present invention.

In one embodiment of the present invention, the remote input signal made up of the remote data stream 461 is transmitted from remote input device interface unit 405 through transmitter 453 to receiver 457 of TV interface unit 403 through wireless link 421. In one embodiment, wireless link 421 is an infrared (IR) interface link. The IR signal received by receiver 457 through wireless link 421 is converted with converter 455 to an RF signal and is then transmitted with transceiver 459 from the TV interface unit 403 through wireless link 419 to local PC interface unit 401, located in the den 431. In that embodiment, converter 455 includes additional circuitry (not shown) that converts the IR signal received by receiver 457 to a corresponding RF signal using well known techniques.

In another embodiment, it is noted that the remote data stream 461 may be transmitted from remote input device interface unit 405 to TV interface unit 403 directly through a cable (not shown) having sufficient length to allow a user to operate the remote input devices 423A–E at a comfortable distance from the TV 409. In this embodiment, wireless link 421 is no longer utilized. Thus, the present invention enables a user to remotely interact with the PC located in the den 431 from remote input devices 423A–E located in the family room 433 while watching TV 409 and listening to stereo 411.

Figure 5:
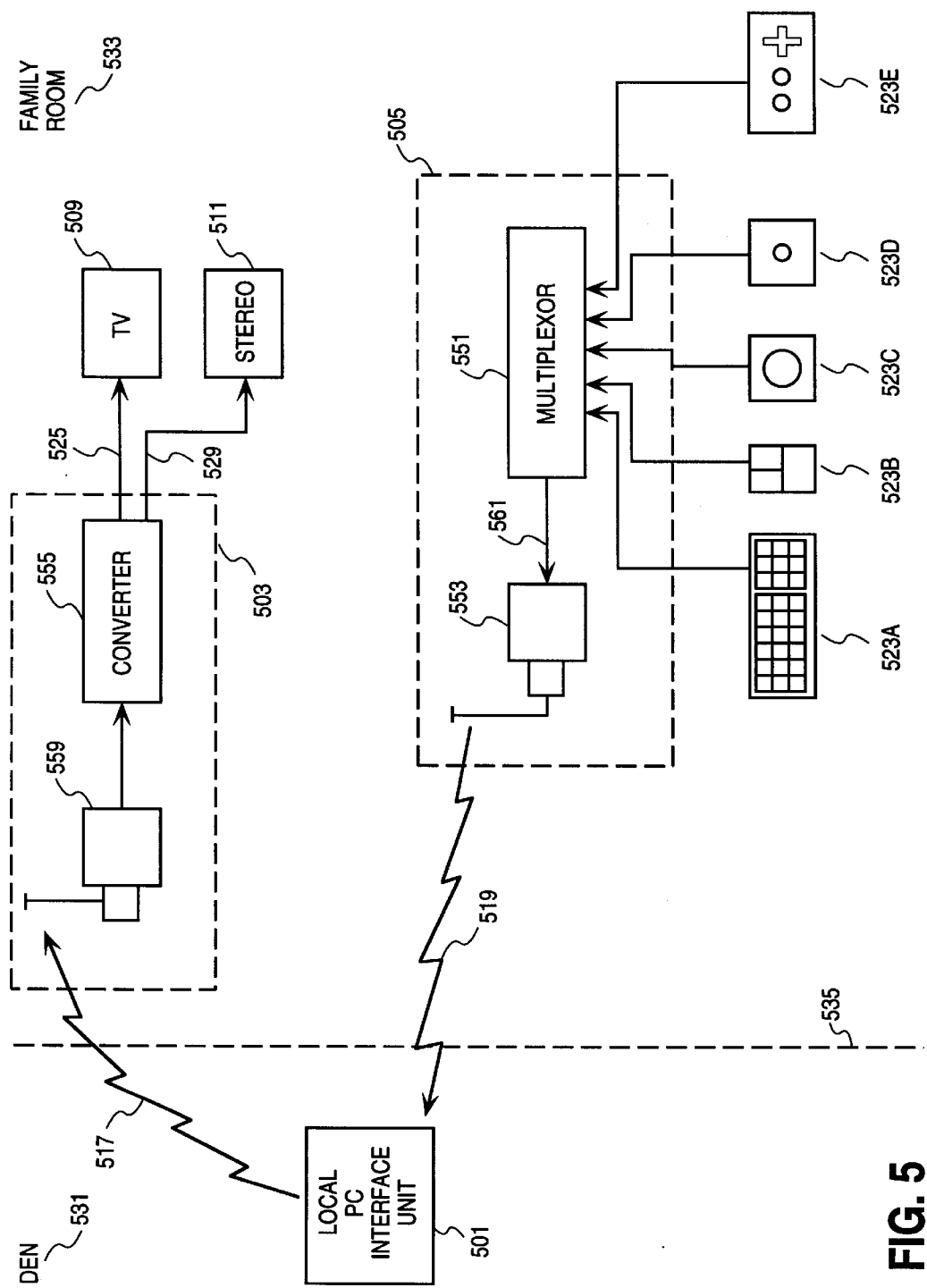
FIG. 5 is a block diagram illustrating the functional units of another embodiment of a TV interface unit and a remote input device interface unit in accordance with the teachings of the present invention.

FIG. 5 is a block diagram of another embodiment of TV interface unit 503 and remote input device interface unit 505 in accordance with the teachings of the present invention. As shown in FIG. 5, a local PC interface unit 501 is located in the den 531, which is shown on the left-hand side of dashed line 535. TV interface unit 503 and remote input device interface unit 505 are located in the family room 533, which is shown on the right-hand side of dashed line 535. A TV 509 and an audio reproduction device, such as a stereo 511 are coupled to the TV interface unit 503. TV interface unit 503 receives the audio/video signal from local PC interface unit 501 through wireless link 517 with receiver 559. In one embodiment of the present invention, wireless link 517 is an RF signal and converter 555 downshifts the RF signal to an audio/video signal 525 suitable for display on TV 509. In one embodiment, converter 555 also generates a separate audio signal 529 suitable for playback on stereo 511.

Remote input device interface unit 505 is coupled to a plurality of ordinary PC input devices such as for example a keyboard 523A, a mouse 523B, a trackball 523C, a joystick 523D and a game controller 523E. Remote input device interface unit 505 receives remote input signals from remote input devices 523A–E and multiplexes each of the remote input signals into a single remote input device data stream 561.

In one embodiment of the present invention, the remote input signal that includes the remote input signal data stream 561 is converted to an RF signal and is transmitted with transmitter 553 of remote input device interface unit 505 directly to local PC interface unit 501 without having to be transmitted first to TV interface unit 503, such as shown in the embodiment illustrated in FIG. 4. In the embodiment shown in FIG. 5, since the wireless link 519 carries an RF signal, remote input device signals may therefore be received directly from remote input device interface unit 505.

Thus, what has been described is a method and an apparatus for remotely interacting with a PC. In the foregoing detailed description, the method and apparatus of the present invention have been described with reference to specific example or embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method of remotely interacting with a personal computer (PC) comprising the steps of:

transmitting through a first wireless link a video output signal of the PC located at a local site to a television (TV) located at a remote site;

displaying the video output signal on the TV located at the remote site;

multiplexing a plurality of remote input signals generated from a plurality of remote input devices into a remote data stream;

demultiplexing the remote data stream into the plurality of remote input signals;

multiplexing each one of the plurality of remote input signals with a corresponding one of a plurality of local input signals generated from a plurality of local input devices;

manipulating one of the plurality of remote input devices located at the remote site to control the PC;

updating the video output signal displayed on the TV in response to the remote input signal from said one of the plurality of remote input devices.

2. The method described in claim 1 including the additional step of converting the video output signal of the PC located at a local site from a first format suitable for display on a computer monitor to a second format suitable for display on the TV.

3. The method described in claim 1 wherein the step of transmitting the video output signal includes the step of transmitting a radio frequency (RF) signal from the PC located at the local site to the TV located at the remote site.

4. The method described in claim 3 wherein the step of displaying the video output signal includes the steps of:

receiving the RF signal from the PC; and converting the RF signal to a format suitable for being displayed on the TV.

5. The method described in claim 1 including the additional step of transmitting through the first wireless link an audio output signal of the PC to the TV located at the remote site.

6. The method described in claim 1 including the additional step of transmitting through the first wireless link an audio output signal of the PC to an audio reproducing device located at the remote site.

7. The method described in claim 1 wherein the step of transmitting the video output signal includes the step of transmitting an audio/video signal to the TV located at a remote site.

8. The method described in claim 1 including the additional step of transmitting the remote data stream to the PC through a second wireless link.

9. The method described in claim 8 wherein the step of transmitting the remote data stream includes the step of transmitting a RF remote input signal from the remote site to the local site.

10. A personal computer (PC) interface system, comprising:

a local PC interface unit to be coupled to a PC, the local PC interface unit to be coupled to receive a video output signal from the PC, the local PC interface unit to be coupled to a plurality of local input devices, each one of the plurality of local input devices to generate one of a plurality of local input signals to control the PC, the PC to be coupled to receive the plurality of local input signals through the local PC interface unit;

a television (TV) interface unit to be coupled to a TV, the TV interface unit to be coupled to receive the video output signal from the local PC interface unit through a first wireless link, wherein the TV is configured to display the video output signal;

a remote multiplexor to be coupled to a plurality of remote input devices to generate a remote data stream from a plurality of remote input signals generated by the plurality of remote input devices to control the PC;

a demultiplexor coupled to the remote multiplexor to demultiplex the remote data stream into the plurality of remote input signals; and a plurality of local multiplexors to be coupled between the demultiplexor and the PC, the plurality of local multiplexors to multiplex each one of the plurality of remote input signals with a corresponding one of the plurality of local input signals.

11. The PC interface system described in claim 10 further comprising a remote input device interface unit coupled between the local PC interface unit and the plurality of remote input devices, the remote input device interface unit including the remote multiplexor.

12. The PC interface system described in claim 11 wherein the remote input device interface unit is wirelessly coupled to the local PC interface unit.

13. The PC interface system described in claim 11 wherein the TV interface unit is coupled between the local PC interface unit and the remote input device interface unit.

14. The PC interface system described in claim 13 wherein the remote input device interface unit is wirelessly coupled to the TV interface unit.

15. The PC interface system described in claim 10 wherein the local PC interface unit is further coupled to receive an audio output signal from the PC, wherein the TV interface unit is further coupled to receive the audio output signal from the local PC interface unit through the first wireless link.

16. The PC interface system described in claim 15 further comprising an audio reproduction device coupled to the TV interface unit, the audio reproduction device configured to generate sound in response to the audio output signal.

17. The PC interface system described in claim 16 wherein the audio reproduction device is the TV.

18. The PC interface system described in claim 16 wherein the audio reproduction device is a home stereo.

19. The PC interface system described in claim 10 wherein the video output signal is a video graphics adapter (VGA) video signal, the local PC interface unit converting the VGA video signal to a National Television Standards Committee (NTSC) video signal, the local PC interface unit further converting the NTSC video signal to a radio frequency (RF) video signal.

20. The PC interface system described in claim 19 wherein the TV interface unit converts the RF video signal received from the local PC interface unit to a baseband video signal suitable for display on the TV, the TV coupled to receive and display the baseband video signal.

21. The PC interface system described in claim 19 wherein the TV interface unit is coupled to the local PC interface unit through a radio frequency (RF) link.

22. The PC interface system described in claim 12 wherein the remote input device interface unit is coupled to the local PC interface unit through a radio frequency (RF) link.

23. The PC interface system described in claim 13 wherein the remote input device interface unit is coupled to the TV interface unit through a radio frequency (RF) link.

24. The PC interface system described in claim 13 wherein the remote input device interface unit is coupled to the TV interface unit through an infrared (IR) link.

* * * * *